(12) United States Patent
Lu et al.

(10) Patent No.: US 8,949,791 B2
(45) Date of Patent: Feb. 3, 2015

(54) DISTRIBUTED SOFTWARE TESTING USING CLOUD COMPUTING RESOURCES

(75) Inventors: Zihong Lu, Cupertino, CA (US); Wei Li, Milpitas, CA (US); Karthik Sreenivasa Murthy, Sunnyvale, CA (US); Sirish Raghuram, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1125 days.

(21) Appl. No.: 12/499,285

(22) Filed: Jul. 8, 2009

(65) Prior Publication Data

US 2011/0010691 A1 Jan. 13, 2011

(51) Int. Cl.
G06F 9/44 (2006.01)
G06F 11/36 (2006.01)

(52) U.S. Cl.
CPC .................................. *G06F 11/3688* (2013.01)
USPC ............ 717/124; 717/125; 717/126; 717/127

(58) Field of Classification Search
USPC .................................................. 717/124–135
See application file for complete search history.

(56) References Cited

U.S. PATENT DOCUMENTS

| 6,219,829 | B1* | 4/2001 | Sivakumar et al. | 717/131 |
| 6,925,642 | B1* | 8/2005 | Commander | 718/104 |
| 8,032,634 | B1* | 10/2011 | Eppstein et al. | 709/226 |
| 2002/0026462 | A1* | 2/2002 | Shotton et al. | 707/523 |
| 2006/0112182 | A1* | 5/2006 | Chen et al. | 709/229 |
| 2007/0234293 | A1* | 10/2007 | Noller et al. | 717/124 |
| 2008/0072100 | A1* | 3/2008 | Okada | 714/28 |
| 2009/0300423 | A1* | 12/2009 | Ferris | 714/38 |
| 2009/0307763 | A1* | 12/2009 | Rawlins et al. | 726/5 |
| 2009/0327471 | A1* | 12/2009 | Astete et al. | 709/223 |
| 2010/0070230 | A1* | 3/2010 | Kumar et al. | 702/119 |
| 2010/0198960 | A1* | 8/2010 | Kirschnick et al. | 709/224 |

* cited by examiner

*Primary Examiner* — Chat Do
*Assistant Examiner* — Jae Jeon

(57) ABSTRACT

A method of creating computing environment in a cloud computing environment for execution of a test is disclosed. The method includes loading a setup script from a script store. The loading is performed by a test manager that is in communication with the script store. The test manager checks if there are more setup scripts to be loaded. If yes, the remaining setup scripts are loaded by the test manager. The test manager then calculates computing resources needed to run all tests as coded in all loaded scripts. The test manager then attempts to reserve needed computing resources in a virtual data center using a data center infrastructure manager.

14 Claims, 5 Drawing Sheets

| Test Name | Operation | Resources Needed |
|---|---|---|
| T1 | VM Scan Test | VM1, VM2 |
| T2 | Host Patching Test | VM1, VM3 |
| T3 | VM Remediation Test | VM1, VM2 |

Fig. 2

DISTRIBUTED SOFTWARE TESTING USING CLOUD COMPUTING RESOURCES

BACKGROUND

In the conventional system testing, testers typically perform a parallel testing within one machine, either multi-threading or multi-processing, to shorten testing time cycles. However, different threads and processes on the testing machine still compete for the same computing resources. The other approach is to use multiple sets of statically configured computing hardware for parallel testing, or distributed testing. This configuration requires more computing resources. Further, this static configuration of resources is not adaptable to dynamic reconfigurations of hardware resources to meet the changed testing requirements.

Products such as Surgient VQMS™ and VMware vCenter Lab Manager™ provide resource reservation features in a virtual data center. These products are used to setup the required environment for executing tests.

SUMMARY

In one embodiment, a method of creating computing environment for execution of a test is disclosed. The method includes loading a setup script from a script store. The loading is performed by a test manager that is in communication with the script store. The test manager checks if there are more setup scripts to be loaded. If yes, the remaining setup scripts are loaded by the test manager. The test manager then calculates computing resources needed to run all tests as coded in all loaded scripts. The test manager then attempts to reserve needed computing resources in a virtual data center through a data center infrastructure manager.

In another embodiment, a computer readable media for storing programming instructions for creating computing environment for execution of a test. The computer readable media includes programming instructions for loading a setup script from a script store, the loading being performed by a test manager that is in communication with the script store and programming instructions for checking if there are more setup scripts to be loaded. The computer readable media further includes programming instructions for calculating computing resources needed to run all tests as coded in all loaded scripts and programming instructions for attempting to reserve needed computing resources in a virtual data center.

In yet another embodiment, a test manager for creating computing environment for execution of a test. The test manager includes a script loader to load one or more setup scripts from a testsuite store, a testsuite merge module to merge two setup scripts and an interfacing module to communicate with a virtual data center. The test manager also includes a computing environment setup module to calculate computing resource requirements and reserving the computing resources in the virtual data center.

BRIEF DESCRIPTION OF THE DRAWINGS

FIG. 2 illustrates an exemplary table showing test names and resources in accordance with one or more embodiments of the present invention.

DETAILED DESCRIPTION

Figure 1:
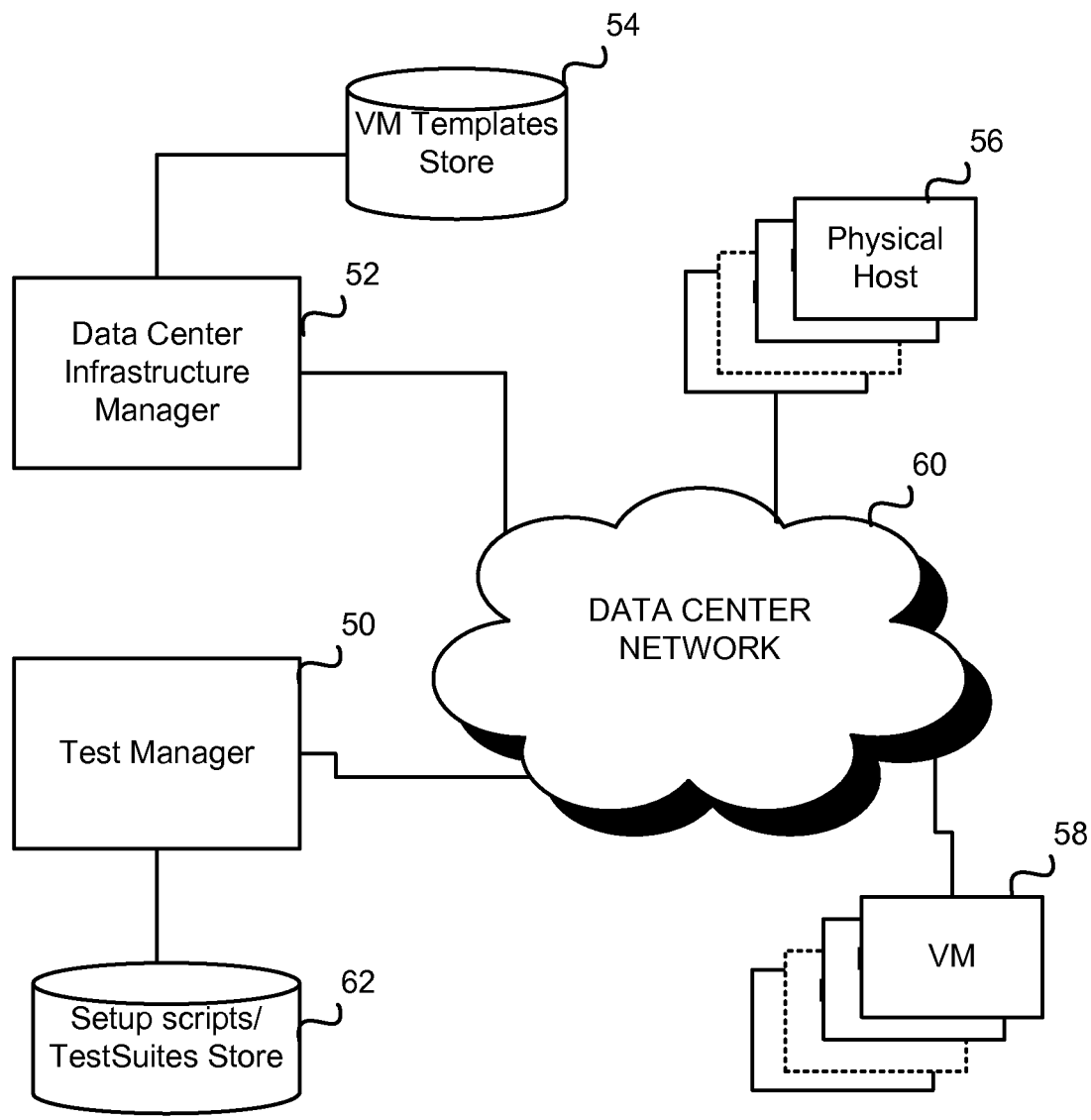
FIG. 1 illustrates a networked system having physical machines, virtual machine templates, a data center infrastructure manager, and a test manager in accordance with one or more embodiments of the present invention.

FIG. 1 illustrates a computing system having a Test Manager 50, a Data Center Network 60, a Data Center Infrastructure Manager 52, a plurality of physical computing machines or physical hosts 56 and a plurality of virtual machines 58. Test Manager 50 includes a data store 62 that stores set up scripts. Data Center Infrastructure Manager 52 includes a VM Templates Store 54 for storing virtual machine files. A virtual machine file can be used to launch a virtual machine. In one embodiment, at least some of the Physical Hosts 56 include a virtualization software (e.g., hypervisor).

In one embodiment Data Center Infrastructure Manager 52 provides interfaces to enable managing data center resources and launching virtual machines, providing resource reservation, etc. For example, if a user wants to launch a particular type of virtual machine on a particular type of physical host, Data Center Infrastructure Manager would facilitate the performance of this task by providing interfaces to the user for selecting a virtual machine template from VM Template Store 54, selecting a physical host and launching the virtual machine. In another example, Data Center Infrastructure Manager 52 also permits a user or a program to reserve computing resources in a data center that is being managed by Data Center Infrastructure Manager 52. In this example, a user or a program requests Data Center Infrastructure Manger 52 to set aside a particular types of resources, such as particular virtual machines running on particular types of physical hosts and including a particular type of networking, etc. It may be noted that configurable virtual network switches (not shown) may be employed to provide a particular networking configuration among virtual machines.

Test Manager 50 is used to setup testing environments for executing various types of tests on a selected type of computing resources. Test Manager 50 retrieves setup scripts from Setup Scripts Store 62 to prepare instructions for Data Center Infrastructure Manager 52. These instructions are based on the application programming interface (API) exposed by Data Center Infrastructure Manager 52. Data Center Infrastructure Manager 52 is capable of creating new virtual machines, configure these newly created virtual machines in a selected network configuration and other data center provisioning tasks. The API exposed by Data Center Infrastructure Manager 52, in one embodiment, is defined to accept instructions as to creating specifically configured virtual machines based on pre-configured virtual machine templates. In one embodiment, virtual machine templates are stored in VM Template Store 54, which is accessible to Data Center Infrastructure Manager 52.

FIG. 2 illustrates semantics of a setup script to setup computing environments for executing selected operations or tests. The setup script broadly includes the name of an operation or a test and names of virtual machine templates. The script may also include a brief description of the operation to be performed in a particular test or operation. The script may also include identities of hypervisors and virtual data center management host to be used for hosting and managing a particular virtual machine. In one embodiment, the script also includes necessary authentication information to enable usage of various data center components such as hypervisors, virtual data center managers, networking configurators, etc. In summary, a setup script contains data that is interpreted by Test Manager 50, which in turn uses Data Center Infrastructure Manager 52 to setup the required computing environment in a virtual data center.

In one or more embodiments, Test Manager 50 is capable of identifying common resources among various tests or operations. For example, FIG. 2 illustrates that test T1 and T3 need the same virtual machines. Hence, test T3 can run on the setup created for the test T1. Also, the test T1 and T2 uses a common virtual machine. Hence, Test Manager 50, when moving from the test T1 to T2, will reuse the virtual machine VM1. It may be noted that FIG. 2 illustrates a very simple setup for the sake of clarity. In one or more embodiments, a setup script may also include identities of virtual infrastructure managers and hypervisors that need to be used to setup particular virtual machines and their interconnectivities.

Figure 3:
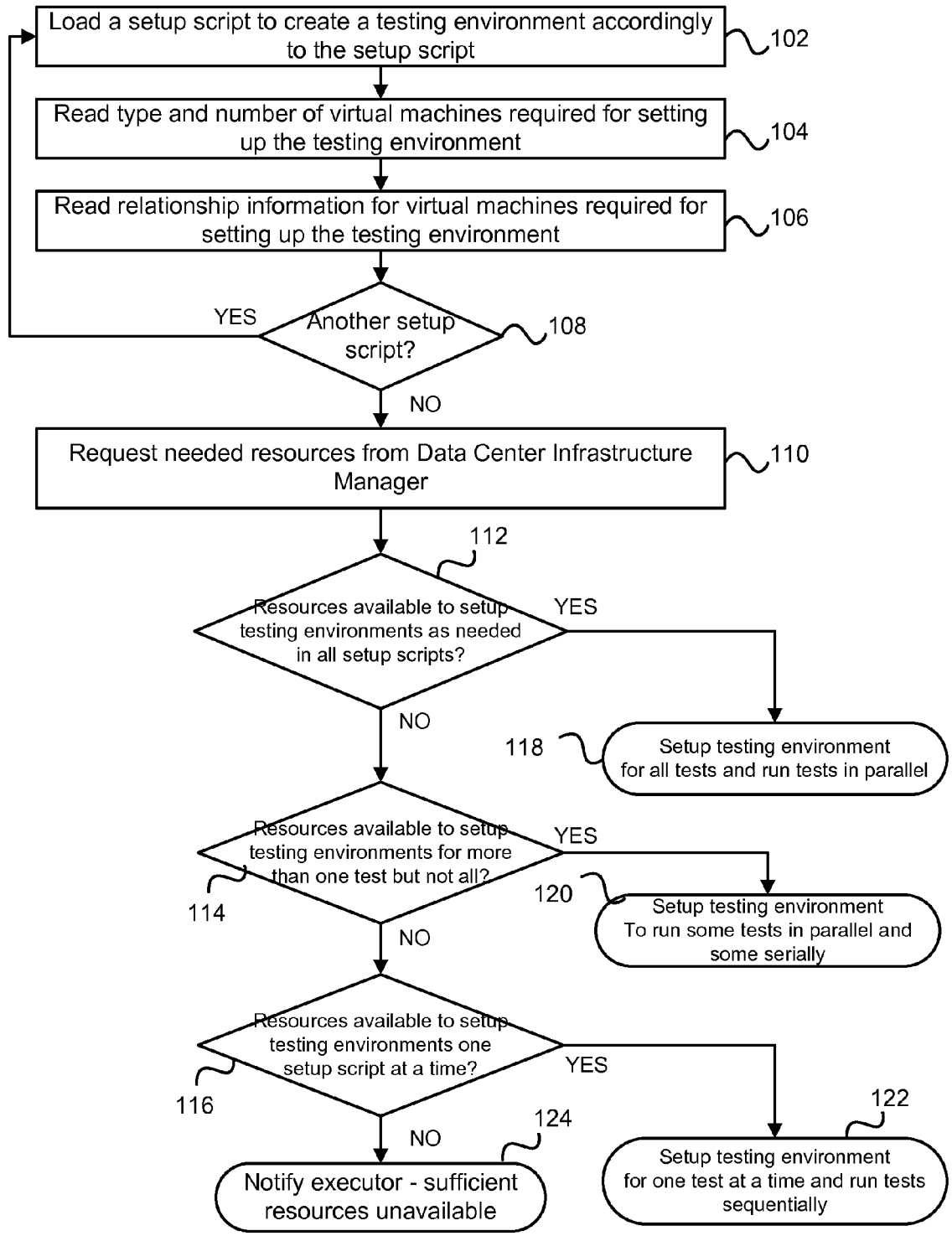
FIG. 3 illustrates a process of setting up environment for executing one or more tests in accordance with one or more embodiments of the present invention.

FIG. 3 illustrates a process of setting up computing environments based on data in one or more setup scripts in accordance with one or more embodiments. At step 102, a setup script is loaded in Test Manager 50 (FIG. 1) from Setup Scripts Store 62. In another embodiment a setup script may be loaded from a file system or any other type of data storage that is capable of storing operating system files. At step 104, Test Manager 50 reads computing resource requirements from the setup script. Computing resource requirements includes number of virtual machines needed, types of virtual machines needed (for example, what software should be included in a virtual machine, memory configurations, etc.). Computing resource requirements may also include identities of hypervisors and virtual data center managers (such as VMware vCenter Lab Manager™ in conjunction with VMware vCenter™) that should be used for hosting virtual machines. At step 106, Test Manager 50 reads networking information and relationship information among the virtual machines that are needed to be setup. Relationship information includes application relationship information among the virtual machines. For example, if virtual machine 1 needs to be a database server and virtual machine 2 hosts a client application that uses this database server, the setup script would provide the client-server connectivity information. In one or more embodiments, if more softwares are needed to build the required relationship, these softwares are installed in the virtual machines prior to running the tests.

At decision step 108, if there is another setup script that needs to be loaded, the control is moved back to step 102. If no other setup script needs to be loaded, at step 110, Test Manager 50 formats a request to reserve necessary resources in the virtual data center and sends the request to Data Center Infrastructure Manager 52 (FIG. 1).

In one or more embodiments, reserving resources includes identifying necessary resources in a virtual data center being monitored and managed by Data Center Infrastructure Manager 52 and setting them aside for a particular use by a particular requester (such as the test manager in this case). In one example, the reserved resources are moved into a private network accessible only to the requester. In other embodiments, an access control mechanism may also be employed to isolate the reserved resources. If some resources do not currently exist in the virtual data center, these resources are created by Data Center Infrastructure Manager 52. For example, if a virtual machine in a requested configuration is not available in the available computing resources, Data Center Infrastructure Manager 52 instantiate a new virtual machine having the requested configuration from the VM template store. The virtual data center can be a private data center, a public data center, or a mixed private and public data center, or cloud. A cloud is a collection of computing resources and applications in which dynamically scalable and often virtualized resources are provided as a service over a network. The computing resources provided by a cloud are generally transparent to the users of the computing resources. A user simply requests a certain type of computing environment through Data Center Infrastructure Manager 52, the user does not need to know about the arcane details of the virtual data center itself.

At decision step 112, a determination is made if required resources are available to setup a computing environment as needed in all loaded setup scripts. If yes, then at step 118, a computing environment to run all operations or tests is created. Test Manager 50 then runs either all operations in parallel or some tests in parallel and then other tests after the conclusion of some required prerequisite tests or operations. If at decision step 112 the answer is no, then at decision step 114, a determination is made if resources are available to run some tests in parallel but not enough to run all tests in parallel, then at step 120, a computing environment to run some tests in parallel is created. Test Manager 50 monitors conclusion of tests and as the tests are concludes, Test Manager 50 requests Data Center Infrastructure Manager 52 to release resources reserved for the tests just concluded to make room for the remaining tests. If not, then at decision step 116, a determination is made if resources are available to run tests in one setup script at a time. If no, Test Manager 50 notifies the user that sufficient resources are not available to run any test. If yes, then Test Manager 50, through Data Center Infrastructure Manager 52, setups a computing environment to run one test at a time.

In another embodiment, the test manager calculates computing resource requirements to run all tests in all loaded scripts in parallel. However, the test manager also considers any interdependency of tests. For example, if a particular test is dependent on another test, the test manager, in one embodiment, leaves this particular test from the calculated resource requirements to run all tests in parallel. After this calculation, the test manager attempts to reserve required computing resources in a virtual data center. If the requested computing resources are not available, then the test manager recalculates by reducing the number of the loaded setup scripts in the calculations and repeating the resource reservation process again, until the required resources are obtained or it is determined that sufficient resources are not available. In one embodiment, if a test in a group of tests fails, then the computing resources in the same setup are preserved for a post test debugging. In one or more embodiments, a snapshot of the computing resources is taken and stored in a storage for a later re-creation of the same computing environment setup for debugging. In this case, the computing resources in the virtual data center will not need to be preserved and may be dismantled to make the resources available for other uses.

Figure 4:
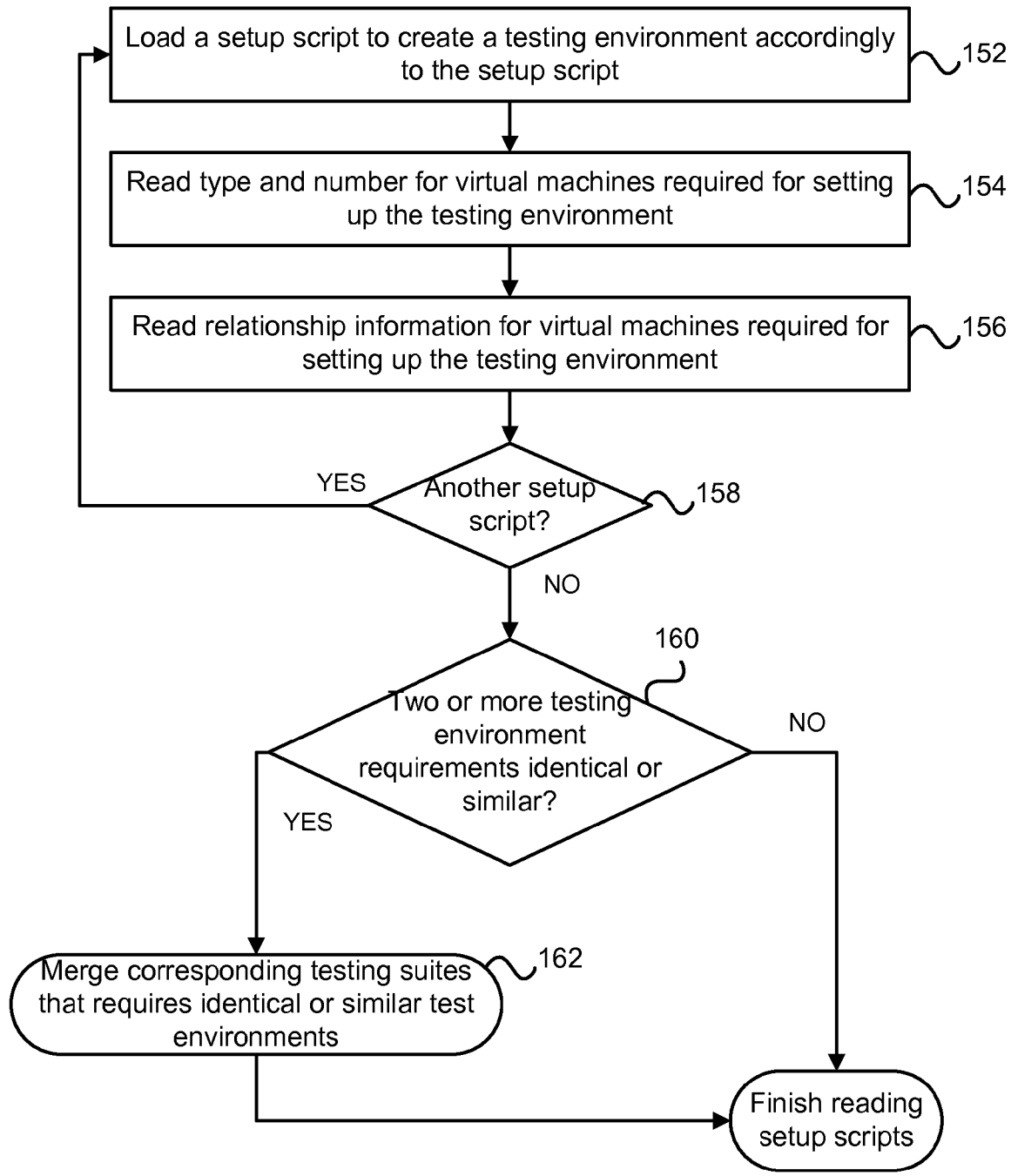
FIG. 4 illustrates a process of merging two or more test suites based on their corresponding resources requirements in accordance with one or more embodiments of the present invention.

FIG. 4 illustrates a process of merging one or more setup scripts during a runtime time processing of setup scripts by Test Manager 50. Step 152, 154, 156 and 158 are identical to steps 102, 104, 106, and 108 of FIG. 3 respectively. At decision step 160, a determination is made if two or more tests require the same computing environments. If yes, at step 162, the corresponding setup scripts are merged at runtime to avoid unnecessary creation and dismantling of a computing or test environment. Test Manager 50 then schedules the tests to run in the identical computing environment, one after another, without going through a cycle of dismantling and creating the same computing environment again and again. In other words, if a second testing requires a same test up as used by a test script prior to the execution of the second test, the computing environment setup is reused to improve over all efficiency. In one or more embodiments, a setup script will notify Test Manager 50 if a rollback of the computing environment to a clean state is required or optional. Hence, for example if two setup scripts for tests T1 and T2 are merged and if T2 runs after T1, T1 setup script may require the test manager to bring the computing environment to a certain clean state prior to the execution of T2.

Figure 5:
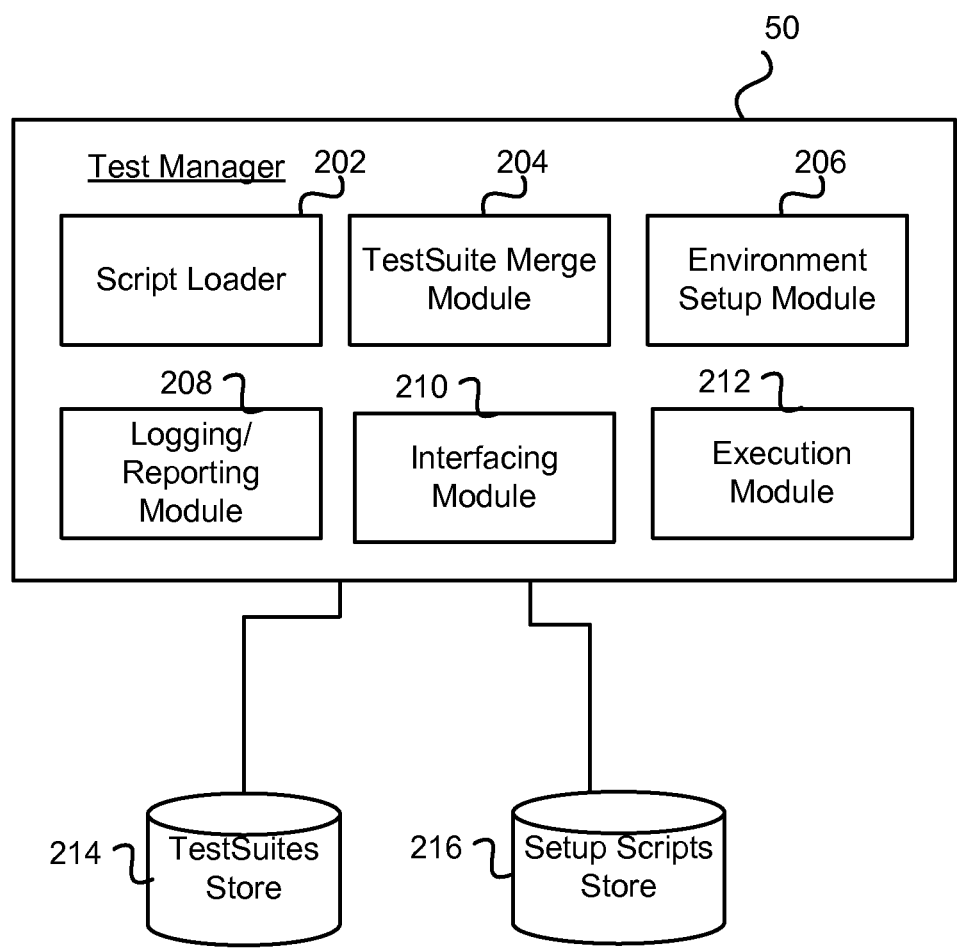
FIG. 5 illustrates a system for setting up a testing environment in accordance with one or more embodiments of the present invention.

FIG. 5 illustrates a logical diagram of Test Manager 50. Test Manager 50 includes a Script Loader 202 module to load and read setup scripts from a data store or a file system. TestSuite Merge Module 204 provides an implementation of the runtime merge process as illustrated in FIG. 4. Environment Setup Module 206 is defined to interact with Data Center Infrastructure Manager 52 to reserve/create computing resources in a virtual data center. Environment Setup Module 206 also implements the logic illustrated in FIG. 3. Environment Setup Module 206 uses Interfacing Module 210 to interact with Data Center Infrastructure Manager 52 and the network. Logging/Reporting Module 208 provides logging and reporting of test setup results and the results of the execution of tests or operations. Execution Module 212 implements logic to run tests or operations after a necessary computing environment has been setup to run a particular test or operation. In one embodiment, Test Manager 50 is coupled to a TestSuites Store 214 and a Setup Scripts Store 216.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of creating computing environment for execution of a test, the method comprising:
   (a) loading a setup script from a script store, the loading being performed by a test manager that is in communication with the script store, wherein the loading includes identifying computing resource requirements to run the test as coded in the setup script, wherein in response to the computing resource requirements to run a test in a first setup script being identical to computing resource requirements to run a second test in a second setup script, dynamically merging the first setup script with the second setup script during run time, and wherein responsive to a notification of a clean state requirement being provided to said test manager from said second setup script said dynamically merging comprises said test manager rolling back a computing resource to a clean state prior to execution of said second test on said computing resource;
   (b) performing step (a) again until all setup scripts that are to be loaded are loaded;
   (c) calculating computing resources needed to run all tests as coded in all loaded scripts; and
   (d) provided needed computing resources in a virtual data center are available for reservation, reserving said needed computing resources in a virtual data center through a virtual data center infrastructure manager.

2. The method as recited in claim 1, wherein the calculating includes determining computing resources to run all tests in parallel.

3. The method as recited in claim 2, wherein if a particular test in all tests is dependent on another test, the calculating includes determining computing resources to run all tests, except the particular test, in parallel.

4. The method as recited in claim 1, wherein if the needed computing resources in the virtual data center may not be reserved, the calculating includes reducing a number of tests to be run in parallel and performing step (d) again.

5. The method as recited in claim 4, wherein if not enough computing resources available to run tests as coded in any one of the setup scripts, notifying the test manager that no resources are available.

6. The method as recited in claim 4, wherein if the needed computing resources are available to run a group of tests in parallel, then reserving the needed computing resources in the virtual data center to run the group of tests in parallel, then dismantling the computing environment after recording results of the group of tests.

7. The method as recited in claim 4, wherein if the needed computing resources are available to run a group of tests in parallel, then reserving the needed computing resources in the virtual data center to run the group of tests in parallel, wherein if a test in the group of tests fails, then preserving the needed computing resources in same setup for a post test debugging.

8. The method as recited in claim 1, wherein the computing environment is isolated and accessible only for the execution of the test.

9. A non-transitory computer readable storage medium having instructions embodied therein that when executed cause a computing system to perform a method for creating a computing environment for execution of a test, the computer readable medium comprising:
 programming instructions for loading a setup script from a script store, the loading being performed by a test manager that is in communication with the script store, and the loading continuing until all setup scripts that are to be loaded are loaded;
 programming instructions for checking for more setup scripts to be loaded;
 programming instructions for dynamically merging a first test script associated with said setup script and a second test script associated with a second setup script during runtime such that said first test script and said second test script run one after another on the same computing resource when computing resource requirements specified by said setup script are identical to computing resource requirements specified by said second setup script, wherein responsive to a notification of a clean state requirement being provided to said test manager from said second setup script said dynamically merging comprises said test manager rolling back said same computing resource to a clean state prior to execution of said second test;
 programming instructions for calculating computing resources needed to run all tests as coded in all loaded scripts; and
 programming instructions for reserving needed computing resources in a virtual data center.

10. The non-transitory computer readable storage medium as recited in claim 9, further including programming instructions for notifying the test manager when no resources are available.

11. The non-transitory computer readable storage medium as recited in claim 9, wherein the programming instructions for loading includes programming instructions for identifying computing resource requirements to run the test as coded in the setup script.

12. A non-transitory computer usable storage medium having computer readable program code embedded therein that when executed causes a computing system to manage tests, said program code comprising:
 a test manager comprising:
  a script loader to load one or more setup scripts from a testsuite store until all setup scripts that are to be loaded are loaded;
  a testsuite merge module to dynamically merge a first setup script and a second setup script during runtime when computing resource requirements to run a first test associated with said first setup script are identical to computing resource requirements to run a second test associated with said second setup script, wherein responsive to a notification of a clean state requirement being provided to said test manager from said second setup script said dynamically merging comprises rolling back a computing resource used by said first test to a clean state prior to execution of said second test on said computing resource;
  an interfacing module to communicate with a virtual data center; and
  a computing environment setup module to calculate computing resource requirements and reserve computing resources in the virtual data center.

13. The non-transitory computer usable storage medium of claim 12 wherein the test manager further includes a logging and reporting module to capture results of test executions.

14. The non-transitory computer usable storage medium of claim 12 wherein the test manager further comprises an execution module to coordinate test executions.

* * * * *